(12) United States Patent
Green

(10) Patent No.: US 7,816,651 B2
(45) Date of Patent: Oct. 19, 2010

(54) HIGH DETECTIVE QUANTUM EFFICIENCY X-RAY DETECTORS

(75) Inventor: Michael C. Green, Palo Alto, CA (US)

(73) Assignee: Varian Medical Systems, Inc., Palo Alto, CA (US)

( * ) Notice: Subject to any disclaimer, the term of this patent is extended or adjusted under 35 U.S.C. 154(b) by 68 days.

(21) Appl. No.: 11/863,185

(22) Filed: Sep. 27, 2007

(65) Prior Publication Data

US 2009/0084960 A1    Apr. 2, 2009

(51) Int. Cl.
*G01T 1/24* (2006.01)
(52) U.S. Cl. .................................. 250/370.01
(58) Field of Classification Search ............ 250/370.09, 250/361 R, 370.01, 370.08
See application file for complete search history.

(56) References Cited

U.S. PATENT DOCUMENTS

| | | | |
|---|---|---|---|
| 4,139,796 A * | 2/1979 | Rose | 313/385 |
| 5,635,706 A * | 6/1997 | She et al. | 250/214 VT |
| 6,888,919 B2 | 5/2005 | Graf | |
| 7,103,137 B2 | 9/2006 | Seppi et al. | |
| 2007/0023853 A1* | 2/2007 | Partain et al. | 257/443 |
| 2008/0253522 A1* | 10/2008 | Boyden et al. | 378/87 |

\* cited by examiner

*Primary Examiner*—David P Porta
*Assistant Examiner*—Marcus H Taningco
(74) *Attorney, Agent, or Firm*—Houst Consulting

(57) ABSTRACT

An image acquisition apparatus includes a conversion layer for generating electrons in response to electromagnetic radiation photons, and a first semiconducting layer adjacent to the conversion layer for generating electron-hole pairs in response to electrons generated by the conversion layer.

17 Claims, 2 Drawing Sheets

HIGH DETECTIVE QUANTUM EFFICIENCY X-RAY DETECTORS

BACKGROUND

The present invention relates in general to imaging acquisition devices and in particular to high detective quantum efficiency X-ray detectors.

Imaging systems such as X-ray imaging are widely used in various fields of life and industry. For example, X-ray imaging is commonly used in non-invasive inspection of objects such as cargo containers, luggage, bags, briefcases and the like, to identify hidden contraband at customs and ports. The contraband may include hidden guns, knives, explosive devices and illegal drugs or goods.

Detectors used in existing cargo scanning systems employ scintillator crystals to detect X-rays. Atoms within the scintillator interact with incident X-ray photons and are raised in energy. When the energetically excited atoms in the scintillator decay back to their ground state they emit light. The light is detected by a photodiode placed behind the scintillator. The photodiode generates an electrical signal proportional to the flux of X-rays absorbed in the scintillator.

The detector structure typically consists of a linear array of several hundred individual detector elements each containing a block of scintillator material and a photodiode. The individual detector elements form a strip of pixels, each pixel being of the order of, for example, 5 mm×5 mm in size. The detector strip is illuminated by a fan beam of high energy X-rays (typically >1 MeV photons), from an accelerator or an isotope source.

An important requirement in an X-ray detector is that it should be able to efficiently absorb the incident X-ray photons. If an X-ray photon passes through the detector without interacting, then no information is obtained from that photon. It has simply passed through the detector after irradiating the test object.

A fundamental measure of the performance of a detector is its detective quantum efficiency (DQE). This is a measure of the fidelity of the detector in capturing and transferring image information. The range of DQE is $0<DQE<1$, where the value of 1 implies that all the image information in the incoming X-rays is captured and no noise is added. Even under theoretically perfect conditions, DQE cannot exceed the fraction of the X-ray photons that are absorbed in the detector. Thus, if only 30% of the photons are absorbed, DQE cannot exceed 0.3.

The scintillator materials that are used most frequently in current high energy X-ray detectors are crystalline ceramics such as cadmium tungstate ($CdWO_4$) and bismuth germanate ($Bi_4Ge_3O_{12}$) (abbreviated to BGO). These materials combine the properties of high light output when irradiated with X-rays, rapid decay of light output when the X-ray irradiation is stopped, high average atomic number, and high physical density. The latter two parameters are important for the scintillators to be able to effectively absorb high energy X-ray photons which readily penetrate most materials.

Scintillator materials for scintillator-based X-ray detectors are expensive. Cadmium tungstate and BGO are noteworthy among scintillator materials both for the high average atomic number of their constituents, and their high densities (7.9 and 7.13 gm/cc respectively). These properties make them relatively efficient absorbers of X-rays. However, MeV X-ray photons are used for X-ray scanning of cargo container precisely because of their great penetrating power. This means that even with these high density materials, a considerable thickness of scintillator is needed to absorb a sufficient fraction of the X-ray photons entering the detector.

A typical linear detector array used in a cargo container scanning system is made of many individual blocks of cadmium tungstate approximately 5 mm×5 mm×30 mm in size. The blocks are placed with their long dimension aligned with the path of the incident X-rays. The incident X-ray photons therefore traverse a 30 mm thickness of the scintillator. This is sufficient to absorb approximately 40% of the incident high energy X-rays, which limits the maximum possible DQE to 0.4

Detector-grade cadmium tungstate and BGO scintillator crystals cost of the order of $10,000 per kilogram. If a 30 mm thickness of scintillator material is used, around 8 to 10 kilograms of scintillator will be required for a cargo scanning detector, at a cost of $80K-$100K. This is a crippling cost penalty that forces an engineering tradeoff in terms of the amount of scintillator that can be used versus the detector performance. It is a significant component of the total system cost and it has a negative impact upon system sales.

The above cost figure is for the quantity of scintillator materials required to build a single row detector. If a multi-row detector could be used, then much faster scanning speeds would be possible. This would enable faster throughput of containers which is a key to the acceptance of cargo scanning systems in ports worldwide. However, a multi-row detector is currently not economically viable because of the high cost of the scintillator materials.

SUMMARY OF THE INVENTION

An image acquisition apparatus is provided comprising a conversion layer for generating electrons in response to electromagnetic radiation photons, and a first semiconducting layer adjacent to the conversion layer for generating electron-hole pairs in response to electrons generated by the conversion layer. The electromagnetic radiation beam may be X-ray beam or gamma ray beam. With the correct choice of the conversion layer, the electromagnetic radiation can be infrared ray beam, visible ray beam, and ultraviolet ray beam.

In some embodiments, an X-ray image acquisition apparatus is provided comprising a conversion layer for generating electrons in response to X-ray radiation photons. The conversion layer comprises an edge end defining a thickness of the conversion layer, and a first and a second side surfaces extending from said edge end defining a width and a length of the conversion layer. The conversion layer is configured to be edgewise to incident X-ray radiation photons such that X-ray photons enter the conversion layer edgewise and traverse at least partially through the conversion layer in a widthwise direction.

In some embodiments, an X-ray image acquisition apparatus is provided comprising a tungsten layer for generating electrons in response to X-ray radiation photons, and a first semiconductor layer adjacent to the first side surface of the tungsten layer for generating electron-hole pairs in response to electrons generated by the tungsten layer. The tungsten layer comprises an edge end defining a thickness of the tungsten layer, and a first and a second side surfaces extending from said edge end defining a width and a length of the tungsten layer. The tungsten layer is configured to be edgewise to incident X-ray radiation photons such that X-ray photons enter the tungsten layer edgewise and traverse at least partially through the tungsten layer in a widthwise direction. The first semiconductor layer is disposed adjacent to the first side surface of the tungsten layer for generating electron-hole pairs in response to electrons generated by the tungsten layer.

The first semiconductor layer comprises a plurality of islands in the lengthwise direction of the tungsten layer forming pixels of the X-ray image acquisition apparatus.

In some embodiments, a multi-row X-ray image acquisition apparatus is provided comprising a plurality of conversion layers, and a plurality of semiconducting layers. Each of the conversion layers comprises an edge end defining a thickness of the conversion layer, and a first and a second side surface extending from the edge end defining a width and a length of the conversion layer. The conversion layer is configured to be edgewise to incident X-ray radiation photons such that X-ray photons enter the conversion layer edgewise and traverse at least partially through the conversion layer in a widthwise direction. The conversion layer generates electrons in response to X-ray photons and ejects electrons through the first and second surfaces. Each of the semiconducting layers is placed adjacent to one of the plurality of the conversion layers generating electron-hole pairs in response to electrons ejected from the one adjacent conversion layer.

In another aspect, an imaging method is provided comprising the steps of delivering an electromagnetic beam to an object to be examined, generating electrons in response to an electromagnetic beam transmitted through the object, generating electron-hole pairs in response to the electrons generated, and detecting the electron-hole pairs generated.

BRIEF DESCRIPTION OF THE DRAWINGS

These and various other features and advantages of the present invention will become better understood upon reading of the following detailed description in conjunction with the accompanying drawings and the appended claims provided below, where:

DETAILED DESCRIPTION OF VARIOUS EMBODIMENTS

Figure 1A:
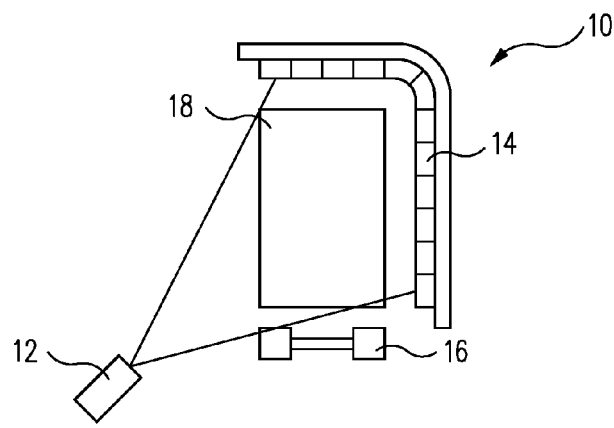
FIG. 1A is a schematic rear view of an X-ray scanning system for inspecting a cargo container in accordance with one embodiment of the present invention.

Various embodiments of the present invention are described hereinafter with reference to the figures. It should be noted that the figures are not drawn to scale and elements of similar structures or functions are represented by like reference numerals throughout the figures. It should also be noted that the figures are only intended to facilitate the description of specific embodiments of the invention. They are not intended as an exhaustive description of the invention or as a limitation on the scope of the invention. In addition, an aspect described in conjunction with a particular embodiment of the present invention is not necessarily limited to that embodiment and can be practiced in any other embodiments of the present invention. For instance, various embodiments of the invention are described with an X-ray imaging system. It will be appreciated that the claimed invention can be used not only for X-ray imaging systems, but also for any other type of imaging systems such as infrared ray, visible ray, and ultraviolet ray imaging systems. Further, various embodiments of the invention are described with a cargo container scanning system using high energy MeV X-ray radiation for illustration purpose. It will be appreciated that the claimed invention can also be used for medical diagnostic and treatment applications using X-ray radiation at various different energy levels.

Figure 1B:
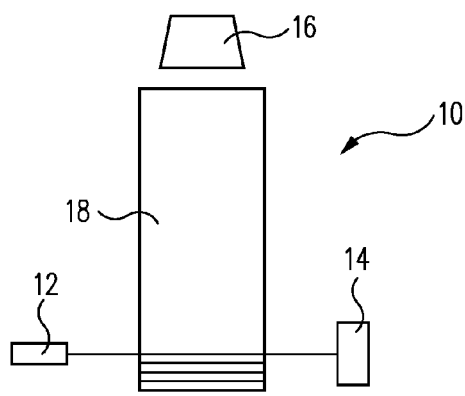
FIG. 1B is a schematic top plane view of the X-ray scanning system shown in FIG. 1A.

FIG. 1A is a schematic rear view of a scanning system 10 for inspecting a cargo container in accordance with one embodiment of the invention. FIG. 1B is a top plane view of the scanning system 10 of FIG. 1A. The scanning system 10 includes one or more X-ray sources 12 and an X-ray detector array 14. Between the source 12 and the detector array 14 is a truck 16 carrying a cargo container 18 moving through the scanning system 10. U.S. Pat. No. 7,103,137 to the same assignee discloses a scanning system for inspecting objects for contraband, the disclosure of which is incorporated herein by reference in its entirety.

The X-ray source 12 may be a source of Bremsstrahlung radiation. To examine cargo containers by a scanning system in accordance with the embodiments of FIGS. 1A-1B, the X-ray source 12 may generate radiation having an energy distribution with an average energy greater than about 1 MeV. The X-ray source 12 may generate radiation having an energy distribution with an average energy greater than about 6 MeV. The X-ray source 12 may be a linear accelerator, such as a Linatron®. Linear Accelerators (Linatrons®), having an accelerating potential in the range of about 6 MeV or greater, are available from Varian Medical Systems, Inc., Palo Alto, Calif. (Varian). In the Varian Linatron®, 360 pulses are typically output per second. The X-ray beam from a Varian Linatron® has an opening angle of about 20-30 degrees. Other X-ray sources may be used as well, such as electrostatic accelerators, microtrons and betatrons. X-ray tubes may also be used, particularly for objects having a width less than about 5 feet (1.5 meters).

The detector array 14 detects X-rays transmitted through the cargo container 18. The detector array 14 may include a plurality of detectors arranged in various configurations. U.S. Pat. No. 7,103,137 to the same assignee discloses a variety of detector arrays for scanning objects for contraband, the disclosure of which is incorporated herein by reference in its entirety. The detector array 18 is electrically connected to a processor, such as a computer (not shown), which reconstructs the data output by the detector array into images. Analog-to-digital converting devices and other electronic components are provided as required. The computer is connected to a display (not shown) that displays the reconstructed images. The computer may store the reconstructed images in a database, along with identifying information about each truck or cargo container, such as the license plate, and other useful information, such as the date that the truck is scanned. The operator of the scanning system can enter the relevant information through a keyboard or the information can be scanned or otherwise entered automatically. The computer is also connected to the X-ray sources to control their operation. Multiple processors or computers may be used as well.

It should be noted that the cargo scanning system 12 shown in FIGS. 1A-1B is provided for illustration purpose and is not intended to limit the scope of the invention. It will be appreciated that the claimed invention can be used in many other applications including medical diagnosis and treatment. The object to be examined can be a patient, or a small object such as a machine part, briefcase and the like. Radiation sources capable of generating radiation beams at various different energy levels may be used depending on specific applications. For example, the radiation source may be configured to generate X-ray radiation beams at a keV energy level as well as a MeV energy level. A keV energy level x-ray radiation beam is generally used for forming images of in an object such as a patient, and is therefore also referred to as an image beam or a diagnostic beam. A MeV energy level X-ray radiation beam is generally used for targeting and treating abnormal tissues in patient or for scanning cargo container. The MeV energy level X-ray radiation beam may also be used for forming images of a patient. In some applications, the radiation source may include an X-ray beam generator that is capable of generating X-ray beams at multiple energy levels. An embodiment uses dual (e.g. keV and MeV) energies to provide additional relevant information. By way of example, U.S. Pat. No. 6,888,919 to the same assignee discloses a system with X-ray radiation sources at different energy levels, the disclosure of which is incorporated herein by reference in its entirety.

Figure 2A:
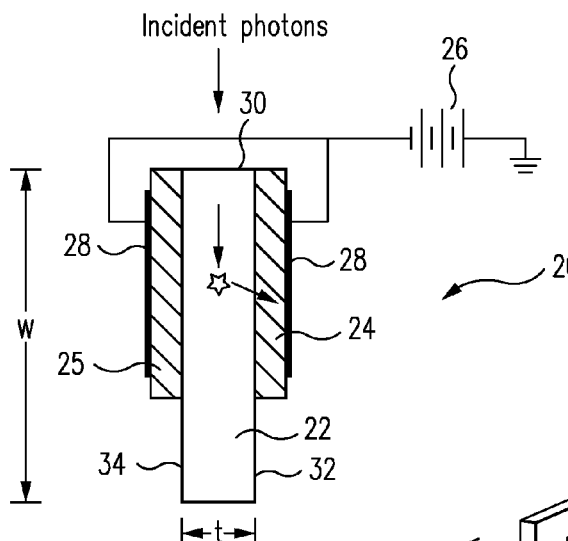
FIG. 2A is a schematic cross-sectional view of an image acquisition apparatus in accordance with one embodiment of the present invention.
Figure 2B:
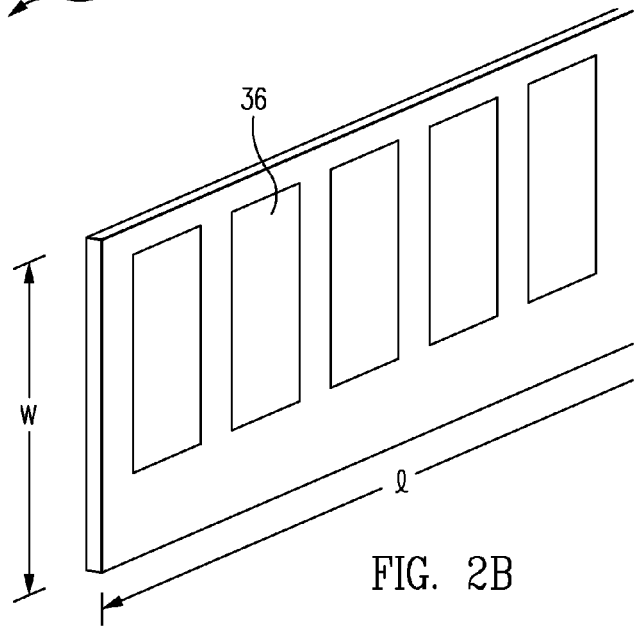
FIG. 2B is a schematic side view of the image acquisition apparatus in accordance with one embodiment of the present invention.

Referring to FIGS. 2A-2B, an image acquisition apparatus or a detector 20 in accordance with one embodiment of the invention is now described.

In general, the image acquisition apparatus 20 comprises a conversion layer 22 capable of generating electrons in response to electromagnetic photons, and a semiconducting layer 24 capable of generating electron-hole pairs in response to electrons generated by the conversion layer 22. The electromagnetic photons may be X-ray photons, gamma ray photons, infrared ray photons, visible ray photons, and ultraviolet ray photons. When energetic photons enter the conversion layer 22, they interact with the electron clouds of the material forming the conversion layer 22. Energetic secondary electrons are formed by means of photoionization, Compton scattering, and electron-positron pair production. Which of these mechanisms is dominant depends upon the energy of the electromagnetic photons. The energetic secondary electrons are ejected through the surfaces of the conversion layer 22 and enter the semiconductor layer 24 as indicated by the arrow in FIG. 2A. Electron-hole pairs are generated within the semiconductor layer 24 in response to energetic electrons. The electron-hole pairs are swept out of the semiconductor layer 24 by an applied voltage 26 via contacts 28, generating a current signal.

In one specific embodiment, the conversion layer 22 comprises an edge end 30 defining a thickness (t) of the conversion layer 22, a first side surface 32 and a second side surface 34 extending from said edge end 30 defining a width (w) and a length (l) of the conversion layer 22. The conversion layer 22 is configured to be edgewise to incident electromagnetic photons so that in operation of the image acquisition apparatus 20, photons enter the conversion layer 22 from the edge end 30 and traverse at least partially through the conversion layer 22 in a widthwise direction. A semiconducting layer 24 capable of generating electron-hole pairs in response to energetic electrons may be disposed in close contact with the first surface 32 of the conversion layer 22. In some embodiments, an additional semiconducting layer 25 may be disposed in close contact with the opposite second surface 34 of the conversion layer 22, forming a structure with the conversion layer 22 sandwiched between two semiconducting layers 24, 25. The semiconducting layer 24 or 25 may include a plurality of divided strips or islands 36 extending at least partially along the width of the conversion layer 22, forming pixels of the image acquisition apparatus 20.

In one specific embodiment, the image acquisition apparatus 20 is an X-ray detector and the conversion layer 22 is capable of generating electrons in response to X-ray photons. The X-rays may be high energy X-rays at an energy level such as greater than 1 MeV. X-rays at energy levels of 4 MeV, 6 MeV, or greater may be used depending on specific applications. The conversion layer 22 may be made of a material of high atomic number (high-Z) adapted to absorb high energy X-rays. As used herein, a high-Z material refers to a material having an atomic number of more than 19, preferably more than 39, or a material having constituents with an atomic number more than 19. By way of example, tungsten is a good material suitable for an X-ray conversion layer for generating electrons in response to X-ray photons. Tungsten has an atomic number of 74 and a density of 19.25 gm/cc. Other exemplary materials suitable for an X-ray conversion layer include tantalum and gold.

In one specific embodiment, the X-ray conversion layer is a sheet or foil of tungsten having a thickness (t) of approximately 0.1 to 1 mm. The tungsten foil may have a width (w) of approximately 3-5 cm and a length (l) of approximately 1 m. Tungsten foil or sheet of various size and shape are commercially available from for example, Metallwerk-Plansee, Ruette, Austria. The tungsten foil is mounted in an X-ray detector to be edgewise to incident X-ray photons so that in operation, X-ray photons enter the tungsten foil from the edge end and traverse at least partially through the tungsten foil in a widthwise direction. By way of example, a tungsten foil of 3 cm wide may absorb more than 70% of X-rays with the X-ray photon energy distribution typical of 6 MeV. In contrast, a 3 cm long crystal of cadmium tungstate scintillator in a prior art X-ray detector can only absorb approximately 40% of the X-rays from the same source.

The semiconducting layer 24 may be of any material that is capable of generating electron-hole pairs in response to energetic electrons. Preferably the semiconductor layer 24 is radiation hard or resistant to enhance lifetime and performance of the image acquisition apparatus 20. Preferably the semiconductor layer 24 has low dark current. The dark current contributes to noise.

The semiconducting layer 24 may be in close contact to the conversion layer 22. Alternatively, the semiconductor layer 24 may be slightly separated from the conversion layer 22. For example, the semiconductor layer 24 may be coated with a thin layer of hard material, for example silicon nitride, which is not itself a semiconductor. This can aid in resisting corrosion and/or abrasion. The secondary electrons may pass through this thin surface coating. The coating may space the semiconductor slightly away from the conversion layer. Alternatively, the semiconductor layer 24 may be deposited directly onto a conversion layer 22 such as a tungsten sheet. In some embodiments, the semiconductor layer 24 may be formed first on a substrate, which may be a rigid or flexible plastic for roll-to-roll processing. The semiconductor layer 24 that is deposited on the substrate is then placed close to a surface of the conversion layer 22. In some embodiments the semiconductor layer may be free standing or self-supporting.

In some embodiments, the semiconductor layer 24 may be divided into strips or islands 36 as shown in FIGS. 2A-2B. The strips or islands 36 form pixels of the image acquisition apparatus 20. The size of the pixels may depend on specific applications. By way of example, X-ray detectors suitable for cargo scanning systems may have pixels ranging from 1 mm×1 mm to 10 mm×10 mm.

In one specific embodiment, a tungsten sheet or foil is used as both a X-ray conversion layer 22 and a substrate for direct deposition of a semiconducting layer 24. In some embodiments, an amorphous silicon (a-Si) PIN diode structure may be formed by depositing successive layers of p-type, intrinsic, and n-type amorphous silicon on the tungsten foil. Techniques for fabricating amorphous silicon PIN diodes on a substrate are well known in the art and therefore description of the techniques is omitted to simply description of the invention. One of the advantages of using amorphous silicon as semiconducting layer is that amorphous silicon is extremely radiation hard and thus desirable for enhancing the lifetime and performance of the device. The PIN diode structure is advantageous in countering dark current in the amorphous silicon. The polarity of the voltage across the semiconductor layer may be chosen so that the diode is reverse-biased. Under these circumstances the dark current is low. The P and N layers may be made very thin relative to the intrinsic layer and the depletion zone in the semiconductor may thereby encompass the entire thickness of the I-layer. The I-layer comprises the major portion of the volume of the semiconductor layer. This configuration increases the efficiency with which the secondary electrons are absorbed in the semiconductor diode structure. The tungsten foil may function as one of the electrical contacts. The other electrical contact may be a metal deposited on the a-Si layers.

The semiconductor layer may also be made of crystalline semiconductor material, for example silicon or germanium, or a compound semiconductor such as GaAs. A diode structure may be formed by creating a PN junction in the semiconductor layer, or by fabricating a contact with a metal that forms a blocking Schottky contact to the semiconductor. The PN junction and the Schottky contact reduce the dark current in the semiconductor.

In some embodiments, semiconductors having wider band gaps, and hence intrinsically lower dark current than those of amorphous silicon may be used. In this case, a simple semiconducting layer rather than a diode structure may be directly deposited onto a tungsten sheet and suffice to reduce dark current to a desirable level. Exemplary semiconductors having wide band gaps include cadmium telluride, cadmium zinc telluride, lead iodide and mercuric iodide. Suitable blocking junctions and contacts may be employed even in the wide gap materials, in order to further reduce the dark current through the semiconductor. Alternatively, a semiconductor having a wider band gap such as mercuric iodide ($HgI_2$) may be deposited on the a-silicon PIN diode structure formed on the tungsten sheet.

In some embodiments, a scintillator layer may be deposited directly on an X-ray conversion layer. In this case, a high-Z conversion layer such as a tungsten sheet is mounted edgewise to the incident X-rays. A thin layer of scintillator material such as for example LANEX® available from Eastman Kodak may be coated onto one or both sides of the tungsten sheet. The scintillator layer emits light in response to the impact of electrons ejected from the conversion layer. Photosensitive devices such as photodiodes may be placed behind the scintillator to generate electrical signal in response to the emitted light. Various scintillator materials may be used. As in the embodiments where semiconducting layers are used, the role of the dense, high-Z sheet or conversion layer is to efficiently absorb high energy X-ray photons thus increasing the attainable DQE of the detector. The conversion layer emits less penetrating secondary electrons that enter the scintillator layer where they have a short range and are very efficiently absorbed. Therefore, a thin layer with a thickness such as 0.001-1 mm (?) of any low cost scintillator material such as LANEX® or glass and glass fiber scintillators may be used.

In some embodiments, the image acquisition apparatus or detector may include two or more conversion layers and two or more semiconducting layers. In this case a multi-row detector is constructed. For example, a multi-row detector may comprise a plurality of conversion layers and a plurality of semiconducting layers in an alternating order, such as a first conversion layer, a first semiconducting layer, a second conversion layer, a second semiconducting layer, a third conversion layer, and a third semiconducting layer, and so on. Each of the conversion layers may be a sheet or foil of high-Z material such as tungsten sheet having a thickness of for example, approximately 0.01 to 1 mm. Each row of tungsten sheet may be configured to be edgewise to the incident, for example, X-ray photons so that X-ray photons enter the tungsten sheet edgewise and traverse through the tungsten foil in a widthwise direction. A multi-row detector enables faster scanning and thus faster throughput of for example cargo containers, which is a key to the acceptance of cargo scanning systems in ports worldwide.

Various modifications of above embodiments may be made and are anticipated by the present invention. For example, the high-Z metal sheet such as tungsten sheet may be mounted in the detector at a slightly off-normal angle for example 1 or more degrees off normal with respect to the incident X-rays impinging on the edge of the tungsten sheet. This configuration can increase the effective secondary electron yield of the high-Z foil.

By way of example, a detector assembly comprised of a stack of nine PN silicon planar photodiodes sandwiched between 0.05 mm gold foils as high-Z metal sheets were tested. CLINAC® linear accelerator was used as an X-ray source transmitting 6 MeV and 10 MeV photons. The detector worked successfully. The effect of mounting the stack of sheets off axis to the incident X-ray beam was also tested, in which an increase of the secondary electron yield from the high Z-foils was observed. The increase was shown in the current from the silicon photodiodes. The output of the detector over a range of tilt angles was measured and a considerable increase in sensitivity up to a tilt angle of 45 degrees was observed. A small additional increase was observed at higher angles. As a comparison, the output from a reference PN silicon planar diode that was not provided with the high-Z gold foil conversion layer was also measured. No change in output with tilt angle from the reference diode was observed.

The high-Z metal sheet may also be made in a "wavy" form to increase the electron yield. Similarly, the semiconducting layer such as amorphous silicon layers may be angled to make a focused detector. In a focused detector, the high-Z sheet and the semiconductor layer can be progressively angled so that the incident high energy X-ray photons impinge on all the detector elements at the optimum angle and this optimum angle is maintained across the surface of the detector.

For example, the detector may be curved into an arc, with the center of curvature at the source point of the X-ray fan beam. Then all the detector elements or pixels are aligned along the direction of the X-ray photon trajectories so that there is no difference in the response or the spatial resolution between a pixel located on the beam axis and a pixel far from the beam axis.

Alternatively, the same focusing effect can be made with a flat detector by progressively tilting the detector elements in proportion to their distance away from the beam axis, so that the incident X-ray photons impinge on all the detector elements at the same angle regardless of their position in the detector. Such an arrangement in a flat detector can be fabricated by progressively tilting the strips of high-Z foil in the detector and/or by appropriately aligning the patches of semiconductor in proportion to their distance from the beam axis.

Other modifications include use of plurality of high-Z metal strips or wires, rather than a sheet or foil, as conversion means to generate energetic electrons in response to X-ray photons. In this case, the semiconducting materials such as PIN a-SI diodes may be coated onto the high-Z metal strips or wires. The coated wires or stripes may be wound into helices to increase X-ray absorption and flux of secondary electrons into the semiconductor.

Figure 3:
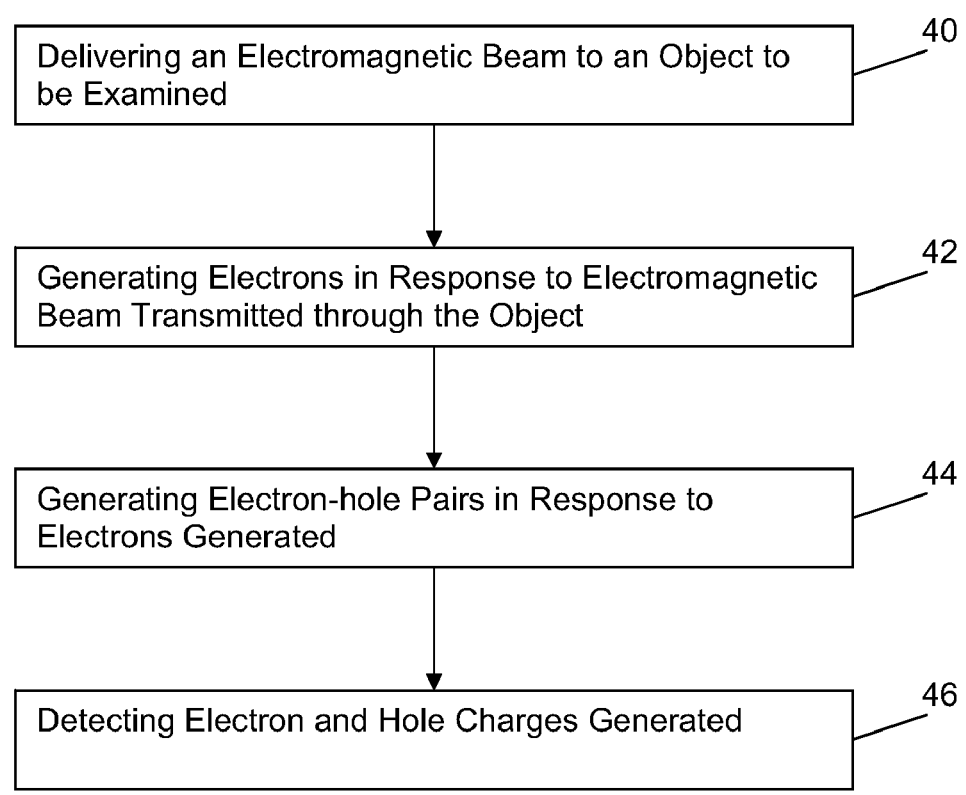
FIG. 3 is a flow chart illustrating an imaging method in accordance with one embodiment of the present invention.

FIG. 3 illustrates an imaging method in accordance with one embodiment of the invention. At step 40, an electromagnetic beam is delivered to an object to be examined. The object can be cargo containers, luggage, bags, briefcases, and patients. Depending on specific application, the electromagnetic beam can be X-ray beam, gamma ray beam, infrared ray beam, visible ray beam, and ultraviolet ray beam. By way of example, X-ray beams at MeV energy levels may be used for scanning cargo containers. At step 42, electrons are generated in response to the electromagnetic beam transmitted through the object. The electrons may be generated using a conversion layer such as a high-Z material. Then at step 44, electron-hole pairs are generated in response to electrons from the conversion layer. The electron-hole pairs may be generated using a semiconductor layer such as an amorphous silicon. At step 46, the electron and hole charges are swept out and detected using for example an electric read-out circuitry.

By now it should be appreciated that an imaging acquisition apparatus with very low cost has been provided. The material of high-Z metal sheet, for example tungsten or tantalum, is less expensive than cadmium tungstate and BGO by one or two orders of magnitude. Multi-row detectors are now economically feasible because of the low cost of the high-Z materials. The assembly cost of the detector should be reduced significantly. Moreover, the dense, high-Z metal sheet is a high efficient MeV X-ray absorber, which enables high attainable DQE. Metal sheet and a-Si semiconductor are exceedingly radiation hard materials and thus enhance the lifetime and performance of the imaging acquisition apparatus.

From the foregoing it will be appreciated that, although specific embodiments of the invention have been described herein for purposes of illustration, various modifications may be made without deviating from the spirit and scope of the invention.

What is claimed is:

1. An image acquisition apparatus comprising a conversion layer for generating electrons in response to electromagnetic radiation photons, and a first semiconducting layer and a second semiconducting layer adjacent to the conversion layer for generating electron-hole pairs in response to electrons generated by the conversion layer.

2. The image acquisition apparatus of claim 1 wherein the conversion layer comprises a first surface, and a second surface, said first semiconducting layer and said second semiconducting layer are adjacent to the first surface of the conversion layer, and said conversion layer is configured such that the electromagnetic radiation photons enter the conversion layer from the second surface of the conversion layer.

3. The image acquisition apparatus of claim 1 wherein said conversion layer comprises an edge end defining a thickness of the conversion layer, and a first and a second side surfaces extending from said edge end defining a width and a length of the conversion layer, said conversion layer being configured such that the electromagnetic radiation photons enter the conversion layer from the edge end and traverse at least partially through the conversion layer in a widthwise direction.

4. The image acquisition apparatus of claim 1 wherein the semiconducting layer comprises a plurality of islands forming pixels of the image acquisition apparatus.

5. The image acquisition apparatus of claim 1 which is an X-ray image acquisition apparatus.

6. The image acquisition apparatus of claim 1 wherein the semiconducting layer comprises PN or PIN junctions.

7. The image acquisition apparatus of claim 1 wherein the semiconducting layer comprises blocking contacts.

8. An X-ray image acquisition apparatus comprising a conversion layer for generating electrons in response to X-ray radiation photons, said conversion layer comprising an edge end defining a thickness of the conversion layer, and a first and a second side surfaces extending from said edge end defining a width and a length of the conversion layer, said conversion layer being configured to be edgewise to incident X-ray radiation photons such that X-ray photons enter the conversion layer edgewise and traverse at least partially through the conversion layer in a widthwise direction, wherein the conversion layer is in a wavy form.

9. The X-ray image acquisition apparatus of claim 8 wherein the conversion layer is comprised of a material having a high atomic number.

10. The X-ray image acquisition apparatus of claim 8 wherein the conversion layer is made of a metal selected from the group consisting of tungsten, gold, and tantalum.

11. The X-ray image acquisition apparatus of claim 8 wherein the conversion layer is a tungsten foil having a thickness from about 0.01 to about 1 mm.

12. The X-ray image acquisition apparatus of claim 8 wherein the conversion layer is configured such that X-ray photons enter the edge end of the conversion layer at a substantially normal angle to the edge end.

13. The X-ray image acquisition apparatus of claim 8 wherein the conversion layer is configured such that X-ray photons enter the edge end of the conversion layer at an angle from about 1 to 45 degrees off normal to the edge end.

14. The image acquisition apparatus of claim 8 wherein the semiconducting layer comprises PN or PIN junctions.

15. The image acquisition apparatus of claim 8 wherein the semiconducting layer comprises blocking contacts.

16. An X-ray image acquisition apparatus, comprising:
a plurality of conversion layers substantially parallel among each other, each of the conversion layers comprising an edge end defining a thickness of the conversion layer, and a first and a second side surfaces extending from said edge end defining a width and a length of the conversion layer, said conversion layer being configured to be edgewise to incident X-ray radiation photons such that X-ray photons enter the conversion layer edgewise and traverse at least partially through the conversion layer in a widthwise direction, said conversion layer generating electrons in response to X-ray photons and ejecting electrons through said first and second surfaces; and
a plurality of semiconducting layers substantially parallel among each other, each of the semiconducting layers being placed adjacent to one of the plurality of the conversion layers generating electron-hole pairs in response to electrons ejected from the one adjacent conversion layer.

17. An image acquisition apparatus comprising a conversion layer for generating electrons in response to electromagnetic radiation photons, and a semiconducting layer adjacent to the conversion layer for generating electron-hole pairs in response to electrons generated by the conversion layer, wherein the semiconducting layer comprises a plurality of islands forming pixels of the image acquisition apparatus.

* * * * *